Jan. 29, 1924.
F. LÖWE
REFRACTOMETER
Filed Dec. 7, 1921
1,481,917
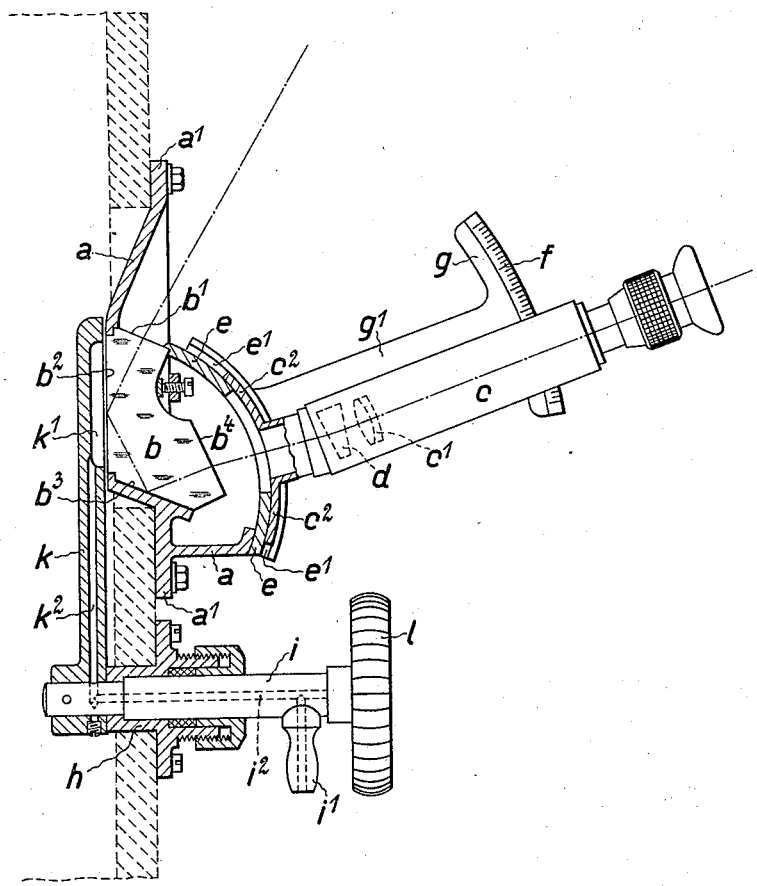
Inventor:
Fritz Löwe Patented Jan. 29, 1924.

1,481,917

UNITED STATES PATENT OFFICE.

FRITZ LÖWE, OF JENA, GERMANY, ASSIGNOR TO THE FIRM OF CARL ZEISS, OF JENA, GERMANY.

REFRACTOMETER.

Application filed December 7, 1921. Serial No. 520,686.

*To all whom it may concern:*

Be it known that I, FRITZ LÖWE, a citizen of the German Empire, residing at Jena, Germany, have invented a new and useful Refractometer, of which the following is a specification.

As is well known, with numerous tasks of chemical technology the light-refracting power of the liquid substances to be used, especially of solutions may be used for obtaining in both a simple and reliable way information about the composition of the liquid and other properties or about the changes taking place during a process, e. g. changes in concentration during evaporation. As a rule, for these purposes there are used refractometers in which the measurement is effected by the boundary line of the total reflection at a prism surface. For many cases, particularly if liquids be concerned which are subjected to a process at a high temperature, under pressure or in the vacuum it is advisable to use stationary refractometers, i. e. to the vessel containing the respective liquid a suitably designed refractometer is so fastened that the totally reflecting surface of the system of entrance prisms is permanently washed by the liquid inside the vessel. This arrangement, however, causes difficulties respecting the transmission of the requisite illuminating rays, since the light cannot generally be transmitted from the front, i. e. from the interior of the vessel as is the case in the usual types of refractometers; on the contrary, the illuminating rays will, as a rule, be transmitted from outside, viz, substantially from the same side of the vessel from which the observation takes place, so that only an observation of the boundary line by reflected light is in question. Hence in the devices of that kind hitherto known, the rays entering the prism system and those emerging from the telescope of the refractometer embrace a comparatively large angle with each other, which has the drawback that the direction of observation embraces with the wall of the vessel a very small angle, whereby the adaptation and the manipulation of the refractometer is rendered difficult.

According to the invention a considerably more favourable arrangement is obtained by disposing in the path of rays of the refractometer behind the totally reflecting surface of the system of entrance prisms, adjoining the liquid another reflecting surface by which the rays emanating from the first mentioned surface are deflected by an angle of at least 90°. Thereby the angle between the rays entering the prism system from outside and those emerging from the telescope is considerably reduced which affords the possibility of a concise construction furnishing a favourable direction of inspection. A particularly suitable construction is thereby obtained if the system of entrance prisms forms in conjunction with the reflecting surface behind it a single glass body which is especially of importance in such devices which are to afford a measurement at a higher temperature. This may, e. g. be realized by causing rays of light, entering laterally, to strike at about the boundary angle the totally reflecting surface, adjoining the liquid and by conducting the reflected rays into the observation telescope with the aid of a second reflecting surface.

Owing to the permanent contact of the refractometer with the liquid it may happen that on the system of entrance prisms there settle in the course of time deposits, e. g. separate crystals which may render difficult and eventually impossible a reliable measurement. For such cases it is advisable to provide the refractometer with a device which admits of cleaning from outside the surface of the system of entrance prisms in contact with the liquid through the wall of the vessel. This may, e. g. be effected in a simple way by means of an arm rotatable from outside which is capable of moving past the entrance surface of the prism system and which thereby wipes the deposits off the latter, provision can be made in addition that the prism surface, prior to a measurement, is cleaned by means of a rinsing fluid let in from outside.

The annexed drawing shows as a constructional example a refractometer in which for the observation there are used in the usual way a rotatable telescope with cross wires and a reading scale rigidly disposed beside the telescope. Besides, there is connected with the refractometer a cleaning device disposed below the latter for mechanically cleaning and rinsing the prism surface adjoining the liquid. The drawing shows, partly in section, a side elevation of the instrument and of the cleaning device.

Within a casing *a* which, in order to be fixed in a wall of a vessel, has a flange $a^1$ running right round there is fastened a glass body $b$, forming the entrance prism system. The prism body $b$ has four optically effective, plane surfaces, viz, an entrance surface or the rays $b^1$ obliquely turned upwards, a vertical reflecting surface $b^2$, free towards the front, a second reflecting surface $b^3$, adjoining a wall of the casing $a$ and an exit surface of the rays $b^4$. The vertical surface $b^2$ coincides with the front surface of the casing $a$ and borders directly on the interior of the vessel to which the instrument is assumed to be joined so as to be in permanent contact with the liquid inside the vessel. The rays obliquely entering from above through the surface $b^1$ strike the surface $b^2$, are reflected by the latter upon the second reflecting surface $b^3$ at the boundary angle of the total reflection and then get through the exit surface $b^4$ into a telescope $c$ serving for the observation. The telescope $c$ carries in front of its objective, shown as a lens system $c^1$ a prism $d$ by which the achromatising of the boundary line is effected in a known way. The casing of the telescope $c$ possesses at its front end an extension $c^2$ curved on a cylindrical surface, and by means of this extension it is guided in a corresponding guide $e^1$ fitted on a rear lid $e$ of the casing $a$, in such a manner as to be manually adjustable relatively to the prism body $b$ within a vertical plane. The refractive index corresponding to the position of the telescope at any one time or a value in connection therewith can be read off on a scale $f$ with the aid of a pointer concealed in the drawing by the telescope, which scale is fixed on a curved body $g$ rigidly connected with the casing $a$ by means of a lateral arm $g^1$. The flange $a^1$ of the casing $a$ affords in addition to the fastening of the complete instrument in the opening of a wall of the vessel simultaneously a safe closure. Besides, the prism body $b$ is fixed in the casing $a$ in such a way as to tightly shut off all around the window-opening for the surface $b^2$. With a view to be able to clean the prism surface $b^2$ during use, there is supported below the refractometer within a bush $h$ fixed in the wall of the vessel an axis $i$ passing through the wall, which axis carries in the interior of the vessel a rotatable arm $k$. The latter is so disposed as to be capable of being moved past with its top end close in front of the prism surface $b^2$ so that, on being rotated, any deposits upon this surface are pushed along by it. The movement of the arm $k$ takes place from outside by means of a hand-wheel $l$ supported by the axis $i$. In order that, if necessary, a rinsing fluid can also be brought upon the prism surface $b^2$, the arm $k$ is provided at its top end with an excavation $k^1$, approximately corresponding to the size of the prism surface $b^2$; into the said excavation a rinsing liquid can be let in from outside through bores $k^2$ and $i^2$. The supply takes place with the aid of a tube-piece $i^1$ fitted to the axis $i$. With each measurement it is necessary after the cleaning of the prism surface $b^2$ to swing the arm $k$ aside so that the liquid inside the vessel has free access to the prism surface $b^2$.

I claim:

1. In a refractometer destined for examining liquids a prism system, containing a surface adapted to totally reflect rays having entered the prism and further containing a reflecting surface behind the first named surface, adapted to deflect by about 90° the rays reflected at the first named surface, a telescope so disposed behind the prism system as to be capable of receiving luminous rays having passed through the said prism system, a scale connected with the telescope and admitting of reading off the position of the extreme rays, yet totally reflected at the first named surface, and fastening means adapted to fix the said refractometer outside in front of an opening of a vessel in such a manner that the said opening is shut off and the first named surface faces the opening.

2. In a refractometer destined for examining liquids, a glass body consisting of one piece and containing a surface adapted to totally reflect rays having entered the said glass body and further containing a reflecting surface behind the first named surface, adapted to deflect by about 90° the rays reflected at the first named surface, behind the said glass body a telescope capable of receiving luminous rays having passed through the said glass body, a scale connected with the telescope and admitting of reading off the position of the extreme rays, yet totally reflected at the first named surface, and fastening means adapted to fix the said refractometer outside in front of an opening of a vessel in such a manner that the said opening is shut off and the first named surface faces the opening.

3. In a refractometer destined for examining liquids a prism system, containing a surface adapted to totally reflect rays having entered the prism and further containing a reflecting surface behind the first named surface, adapted to deflect by about 90° the rays reflected at the first named surface, a telescope so disposed behind the prism system as to be capable of receiving luminous rays having passed through the said prism system, a scale connected with the telescope and admitting of reading off the position of the extreme rays, yet totally reflected at the first named surface, a device disposed in front of this surface and admitting of cleaning the same, and fastening means adapted to fix the said refractometer outside in front of an opening of a vessel in such a manner that the said opening is shut off and the first named surface faces the opening.

4. In a refractometer destined for examining liquids a prism system, containing a surface adapted to totally reflect rays having entered the prism and further containing a reflecting surface behind the first named surface, adapted to deflect by about 90° the rays reflected at the first named surface, a telescope so disposed behind the prism system as to be capable of receiving luminous rays having passed through the said prism system, a scale connected with the telescope and admitting of reading off the position of the extreme rays, yet totally reflected at the first named surface, a hollow body movably disposed in front of this surface and a device adapted to conduct a rinsing liquid on the said surface, and fastening means adapted to fix the said refractometer outside in front of an opening of a vessel in such a manner that the said opening is shut off and the first named surface faces the opening.

FRITZ LÖWE.

Witnesses:
PAUL KRÜGER,
FRITZ SANDER.